(12) United States Patent
Jijina et al.

(10) Patent No.: US 6,587,785 B2
(45) Date of Patent: Jul. 1, 2003

(54) METHOD AND SYSTEM FOR MOBILE VEHICLE RE-ROUTING

(75) Inventors: Jasmin Jijina, West Bloomfield, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/960,438

(22) Filed: Sep. 21, 2001

(65) Prior Publication Data

US 2003/0060977 A1 Mar. 27, 2003

(51) Int. Cl.[7] ............................................. G01C 21/34
(52) U.S. Cl. ...................................... 701/210; 701/117
(58) Field of Search ................................. 701/201, 209, 701/210, 211, 117; 340/995, 989

(56) References Cited

U.S. PATENT DOCUMENTS 5,243,528 A * 9/1993 Lefebvre .................... 701/211
5,928,307 A * 7/1999 Oshizawa et al. .......... 701/210
6,216,086 B1 * 4/2001 Seymour et al. ............ 701/202
6,321,161 B1 * 11/2001 Herbst et al. ............... 701/210
6,456,934 B1 * 9/2002 Matsunaga et al. ........ 701/210

FOREIGN PATENT DOCUMENTS

| JP | 08083399 A | * | 3/1996 | ....... G08G/01/0969 |
| JP | 10253374 A | * | 9/1998 | ........... G01C/21/00 |
| JP | 11064031 A | * | 3/1999 | ........... G01C/21/00 |

* cited by examiner

Primary Examiner—Michael J. Zanelli
(74) Attorney, Agent, or Firm—Anthony Luke Simon

(57) ABSTRACT

The invention provides a method for routing a mobile vehicle around a traffic incident site. A traffic incident location and an intended vehicle route are provided to a route generation algorithm. A polygon based on the traffic incident location and the intended vehicle route is determined. At least one route exit point and at least one route re-entry point are determined. A plurality of intersections within the polygon is determined, and link weights between the intersections are assigned based on at least one condition factor. At least one alternative route between the route exit point and the route re-entry point is determined, based on the assigned link weights. Another aspect of the invention provides an algorithm for re-distributing traffic around a traffic incident site.

16 Claims, 8 Drawing Sheets

METHOD AND SYSTEM FOR MOBILE VEHICLE RE-ROUTING

FIELD OF THE INVENTION

This invention relates generally to a method for re-routing of mobile vehicles. In particular, this invention relates to a method for determining one or more alternative routes around a traffic incident site, and an assignment algorithm for distributing the traffic.

BACKGROUND OF THE INVENTION

With increasing levels of traffic on rural and metropolitan roads, the propensity for traffic accidents, vehicle failures, emergencies and construction on the roadway increases the need for operational vehicles to be effectively re-routed past the affected site or re-routed avoiding the area altogether. Re-routing of traffic around an incident site is of particular importance on expressways, freeways, highways and major arterial roads where the movement of a large number of mobile vehicles may be detrimentally affected. A traffic incident site may include an accident, a slowdown, a blockage of a road segment or a construction area.

Historically, a variety of methods have been used to determine alternative pathways past a traffic incident site. Simple methods include driving on road shoulders and median strips, or moving around the site by following visual directions given by police officers, traffic control personnel or detour signs. Other methods include following behind other vehicles to off-ramps and through local city streets, or unwittingly traversing an alternative route using road signs, landmarks and other means in an attempt to maintain proper direction. If maps or an autonomous geographical information system are available onboard, then they may be consulted for information on alternative routes. Traffic information may also be available from local radio stations, giving locations of traffic incident sites, updated status or suggestions for alternative routes. An individual vehicle operator may also simply wait or move forward on the originally chosen roadway until the incident is passed by, not knowing if maneuvers onto local streets would offer any time benefits.

These approaches may provide a locally acceptable route for bypassing a traffic incident site, however, they neither offer a method for optimization where many vehicles may be affected, nor provide a methodology for an individual vehicle or a multiplicity of vehicles to rapidly get past a traffic incident site. Nor do these approaches provide feedback on the success of alternative routes, or provide for traffic re-distribution over multiple routes. Nor do these approaches provide the mobile vehicle operator with the latest information on current data such as traffic conditions, road construction and other conditions or preferences that may impact the route selection process. Furthermore, these approaches may not provide hands-free operation while selecting or driving along an alternative route, or may not provide accurate, verbal interactions with a real or virtual advisor for exploring possibilities and determining an appropriate exit point, local directions, and a re-entry point to the intended vehicle route.

Inclusion of telematic devices on an increasing number of newer vehicles presents the opportunity for vehicle operators to request information regarding an incident and alternative routes around the incident site. Simply re-routing of all subscribers on a presumed optimal path around an incident site re-routes all subscribers to a new, singular path. All of the vehicles traversing this new path run the risk of creating a new slowdown, or creating a new incident. A method is needed to efficiently and reliably distribute the traffic load around an incident site.

It would be desirable, therefore, to provide a method for generating alternative routes for a mobile vehicle that overcomes the limitations of re-routing methods mentioned above.

SUMMARY OF THE INVENTION

One aspect of the invention provides a method for routing traffic around a traffic incident. A traffic incident location may be provided, along with an intended vehicle route. A polygon may be determined around the traffic incident site and may contain at least one exit point from the intended vehicle route and at least one route re-entry point. Within this polygon, a number of intersections including the route exit point and the route re-entry point may be determined. Between each intersection, a link value or weight may be assigned. The link weights may be based on at least one condition factor. One or more alternative routes between the route exit point and the route re-entry point may be determined, based on the assigned link weights.

The link weights between the identified intersections may be equal to the distance between the intersections, for example, in miles. The link weights may also be based on other condition factors, such as travel time between intersections; orientation of the link with respect to the intended vehicle route; number of traffic lights, duration of each traffic light and their synchronization; local speed limit; number of stop signs, left turns, lanes, cross streets and driveways; road conditions, traffic backup and other points of interest between the intersections; dynamic traffic information, statistically relevant and real time traffic information; time of day; weather; gas requirements; vehicle wear and tear; and personal preferences.

The algorithm for determining the alternative route may be based on local optimization between intersections. One or more alternative routes, however, may be based on selecting a link weight corresponding to a greatest distance between intersections. The alternative routes may be labeled, and assigned to the mobile vehicle based on a traffic re-distribution algorithm. The traffic re-distribution algorithm may simply be a round-robin method, assigning each vehicle, in turn, to one of the labeled routes.

Another aspect of the current invention provides a computer usable medium including a program for determining mobile vehicle routing around a traffic incident site.

The program may include computer program code that receives the location of a traffic incident. The program may also include computer program code that receives an intended mobile vehicle route. The program may include computer program code that determines a polygon based on the traffic incident location and intended vehicle route. The program may include computer program code that determines at least one route exit point and at least one route re-entry point. The program may include computer program code that determines a plurality of intersections within the polygon, and may assign weights to links between the intersections based on at least one condition factor. The program may include computer program code that determines at least one alternative route between the exit point and re-entry point based on the assigned link weights.

The program may also include computer program code that labels each alternative route, and assigns one of the labeled routes to the mobile vehicle using a traffic re-distribution algorithm.

Another aspect of the present invention provides a system for mobile vehicle routing around a traffic incident. The system may include a means for receiving a traffic incident location and a means for receiving an intended vehicle route. The system may also include a means for determining a polygon containing the traffic incident location, a means for determining at least one route exit point and at least one route re-entry point, a means for determining a plurality of intersections within the polygon, a means for assigning weights to links between the intersections, and a means for determining at least one alternative route between the route exit and the route re-entry points.

The system for mobile vehicle routing around a traffic incident may also contain a means for assigning an alternative route to a mobile vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
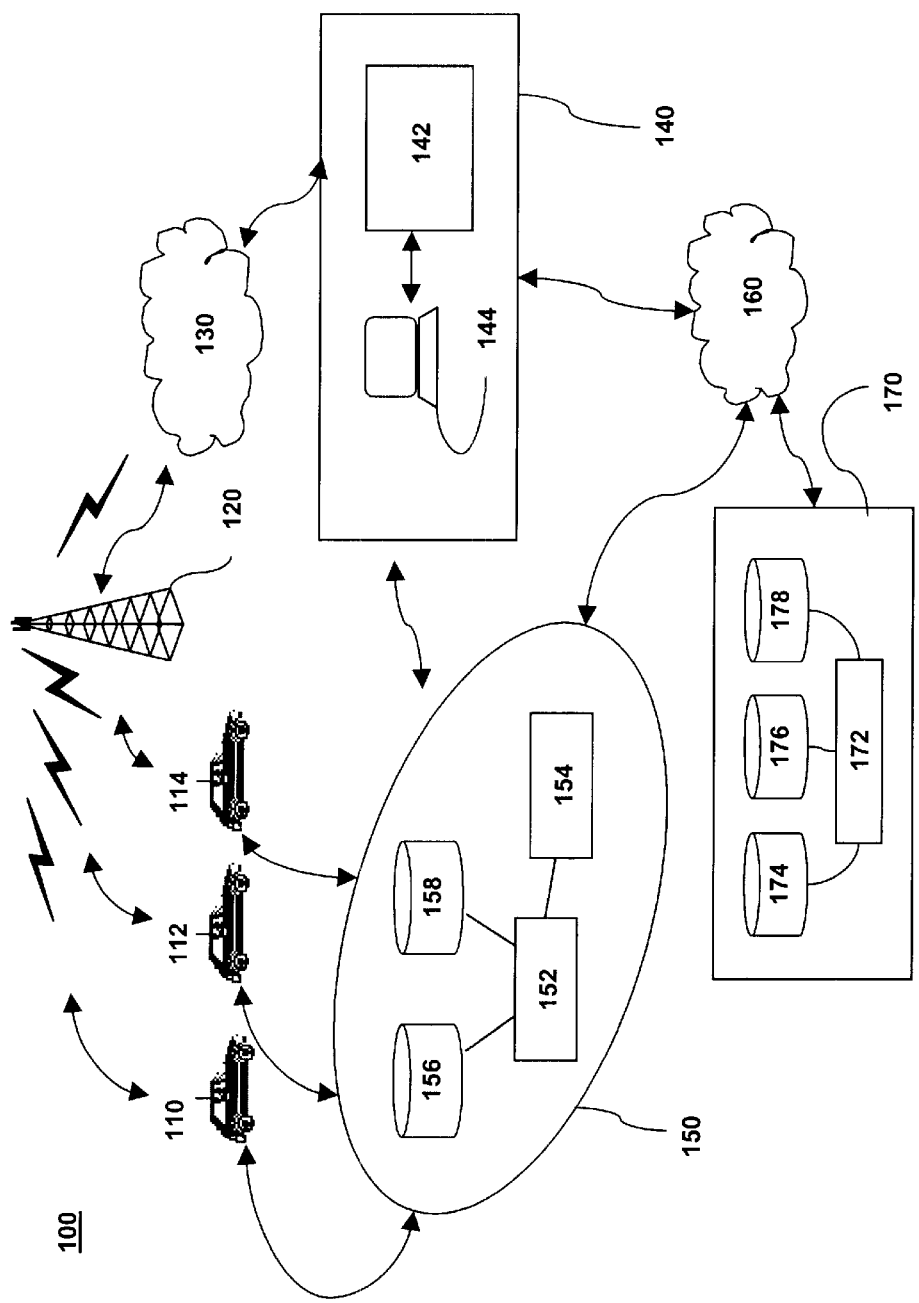
FIG. 1 is a schematic diagram of one embodiment of a system for mobile vehicle re-routing in accordance with the current invention.

FIG. 1 shows one embodiment of a system for mobile vehicle re-routing around a traffic incident site to aid operators of mobile vehicles in accordance with the current invention at 100. The mobile vehicle re-routing system 100 may include one or more vehicle clients 110, 112, 114; one or more carrier systems 120; one or more communication networks 130, 160; one or more service management subsystems 140; and one or more mobile vehicle re-routing subsystems 150. The service management subsystem 140 may comprise one or more service management applications 142 and one or more service managers 144. The mobile vehicle re-routing subsystem 150 may comprise one or more mobile vehicle re-routing applications 152, 154 and one or more databases 156, 158. The mobile vehicle re-routing system 100 may also include one or more database management subsystems 170. The database management subsystem 170 may comprise one or more database management applications 172 and one or more databases 174, 176, 178.

The mobile vehicle re-routing subsystem 150 may be a system for generating suitable alternative routes around a traffic incident site, to be delivered to vehicle clients 110, 112, 114 and for receiving location and intended route information from vehicle client 110, 112, 114. Mobile vehicle re-routing subsystem 150 may be connected to or in communication with service management subsystem 140. Service management subsystem 140 may be used to manage the delivery of information to or from mobile vehicle re-routing subsystem 150 or to other parts of system 100. Features of interest may be delivered or information may be received via a live agent, such as a human advisor, or via a virtual agent, such as an interactive computer program.

Mobile vehicle re-routing subsystem 150 may be any suitable hardware or software configuration, or combination of hardware and software that is configured to generate vehicle re-routing information, process vehicle re-routing information, or transfer vehicle re-routing information to and from vehicle client 110, 112, 114. In one embodiment of the invention, mobile vehicle re-routing subsystem 150 comprises one or more mobile vehicle re-routing applications 152, 154 and one or more databases 156, 158. For example, mobile vehicle re-routing applications 152, 154 may be suitable software applications for generating mobile vehicle re-routing information or otherwise processing mobile vehicle re-routing information. Databases 156, 158 may be any suitable databases for storing relevant re-routing information, such as roadway information, geographical information, historical traffic information, current roadway information, or personal preference information.

Mobile vehicle re-routing application 152, 154 may generate traffic re-routing information in any suitable manner. For example, mobile vehicle re-routing application 152, 154 may generate vehicle re-routing information using geographical information system (GIS) data stored in database 156, 158. That is, mobile vehicle re-routing application 152, 154 may determine mobile vehicle re-routing information using corresponding longitude and latitude coordinate data in database 156, 158 with mobile vehicle coordinate data and intended route information to generate mobile vehicle re-routing information. Alternatively, mobile vehicle re-routing application 152, 154 may determine vehicle re-routing information using corresponding geophysical information contained in database 156, 158. Alternatively, mobile vehicle re-routing application 150 may determine vehicle re-routing information using geospatial data contained in database 156, 158. Alternatively, mobile vehicle re-routing application 150 may determine vehicle re-routing information using current conditions stored in database 156, 158. Alternatively, one or more databases 174, 176, 178 may be used in combination with mobile vehicle re-routing application 152, 154 to generate vehicle re-routing information.

Mobile vehicle re-routing subsystem 150 may reside inside vehicle client 110, 112, 114. One or more databases 156, 158 may also reside inside vehicle client 110, 112, 114. Alternatively, one or more databases 156, 158 may reside at a stationary site. Alternatively, mobile vehicle re-routing subsystem 150 may also reside at a stationary site. One or more databases 156, 158 and/or mobile vehicle re-routing applications 152, 154 residing at a stationary site requires that communications with vehicle client 110, 112, 114 have at least one wireless link. The wireless link may include, for example, data or voice transmission over a cellular phone.

Vehicle client 110, 112, 114 may be any mobile vehicle. For example, the mobile vehicle may be an automobile or truck, or a passenger-carrying unit such as a bus or train. Alternatively, vehicle client 110, 112, 114 may be an occupant of the vehicle, driver of the vehicle, or any suitable client device contained in the vehicle. In one embodiment of the invention, vehicle client 110, 112, 114 is a mobile or portable device equipped to communicate with service management subsystem 140.

Carrier system 120 is any suitable system for transmitting a signal from vehicle client 110, 112, 114 to service management subsystem 140. Carrier system 120 may also transmit a signal from service management subsystem 140 to vehicle client 110, 112, 114. In one embodiment of the invention, carrier system 120 is a wireless carrier system as is well known in the art. Carrier system 120 may be, for example, a cellular phone system. The cellular phone system may be, for example, a system operating nominally at 800 MHz, 900 MHz or 1900 MHz. Carrier system 120 may contain, for example, one or more cellular transmission towers for extended wireless coverage. Carrier system 120 may also include, for example, a transmitter/receiver unit attached to vehicle client 110, 112, 114. Alternatively, carrier system 120 may include a separate transmitter/receiver carried by vehicle client 110, 112, 114.

Communication network 130, 160 is any suitable system for communicating between vehicle client 110, 112, 114 and service management subsystem 140. In one embodiment of the invention, the communication network is a public switched telephone network (PSTN). Alternatively, communication network 130, 160 may be a multi-protocol Internet or intranet capable of transmitting voice and/or data in either analog or digital form, or a combination of both. Alternatively, communication network 130, 160 may be a hybrid communication network or virtual network.

Service management subsystem 140 may be a system for managing one or more services to be delivered to or from vehicle client 110, 112, 114. In one embodiment of the invention, service management subsystem 140 manages services that are distributable over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Service management subsystem 140 may be any suitable hardware or software configuration, or combination of hardware and software that is configured to standardize each service being delivered via the subsystem 140, and to standardize each channel of delivery. In one embodiment of the invention, service management subsystem 140 standardizes each service and channel using personalization information from vehicle client 110, 112, 114. Thus, service management subsystem 140 may have a common profile mechanism across the services being delivered independent of the service distribution channel (live agent, virtual agent, web channel, speech channel) and of the service (news, weather, sports, stocks, etc.). In one embodiment of the invention, service management subsystem comprises one or more application components 142 and one or more service managers 144. For example, service management application 142 may be any suitable software application for managing one or more services. Service manager 144 may be any suitable hardware and/or software configuration or structure for executing service management application 142.

The database management subsystem 170 may be a system for accessing historical and current information for generating suitable alternative routes around a traffic incident site. Information from database management subsystem 170 may be utilized by service management system 140 or mobile vehicle re-routing subsystem 150. Database management subsystem 170 may be any suitable hardware or software configuration, or combination of hardware and software that is configured to access alternative route information. In one embodiment of the invention, database management subsystem 170 comprises one or more database management applications 172 and one or more databases 174, 176, 178. For example, database management application 172 may be a suitable software application for accessing database information. Databases 174, 176, 178 may be any suitable databases containing relevant re-routing information, such as traffic incident location, traffic incident status, incident clearance forecast; road information, detour information, traffic backup information and local weather information.

Figure 2:
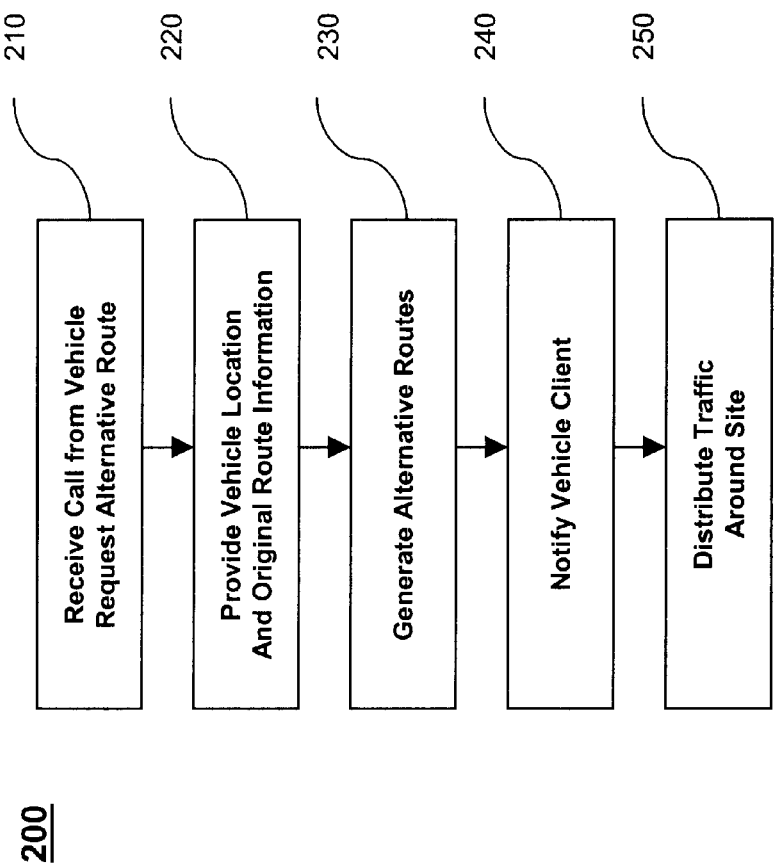
FIG. 2 is a flow diagram of one embodiment of a method for mobile vehicle re-routing in accordance with the current invention.

FIG. 2 shows a flow diagram of one embodiment of a mobile vehicle re-routing system in accordance with the present invention at 200.

As can be seen in block 210, a call may be received from a mobile vehicle client 110, 112, 114. The call may be made to request an alternative route in response to, for example, a traffic incident. The traffic incident site may lie in the intended route of the mobile vehicle. The call may be automatically generated by vehicle client 110, 112, 114. Alternatively, the call may be generated directly by an in-vehicle user. The call may include one or more voice commands between vehicle client 110, 112, 114 and service management subsystem 140. Alternatively, the call may contain a series of data transmissions between vehicle client 110, 112, 114 and service management subsystem 140.

As seen at block 220, the mobile vehicle client 110, 112, 114 may provide an intended vehicle route and current vehicle location to the service management subsystem 140. The mobile vehicle client 110, 112, 114 may provide the intended vehicle route and current location with one or more oral sentences. Alternatively, the mobile vehicle client 110, 112, 114 may provide the intended vehicle route and current location with a series of data transmissions. Oral sentences providing the intended vehicle route and current location may include, for example, the current address of the vehicle and the address of the destination. Data transmissions providing the intended vehicle route and current location may include, for example, a longitude and latitude of the vehicle's current location, current direction and current velocity. The current location, direction and velocity may be provided, for example, by an on-board Global Positioning System (GPS).

As seen at block 230, an alternative route may be generated. The alternative route may be generated, for example, by the service management subsystem 140, in conjunction with mobile vehicle re-routing subsystem 150. Any suitable method for generating the alternative route may be used. Service management subsystem 140 may contain one or more service management applications 142 and one or more service managers 144. Service management subsystem may be in communication with mobile vehicle re-routing application 152, 154. Mobile vehicle re-routing application 152, 154 may have access to database 156, 158 for relevant mobile vehicle re-routing information. Furthermore, service management subsystem 140 may be in communication with database application 172 and therefore have access to databases 174, 176, 178. Databases 174, 176, 178 may contain additional information used to generate alternative routes.

As seen in block 240, vehicle client 110, 112, 114 may be notified. Vehicle client 110, 112, 114 may be notified with alternative route information. Vehicle client 110, 112, 114 may be notified, for example, by an advisor who is a real person, using voice commands. Vehicle client 110, 112, 114 may be notified, for example, by a virtual advisor, using a voice user interface (VUI). Vehicle client 110, 112, 114 may also be notified, for example, using a graphical user interface (GUI). Vehicle client 110, 112, 114 may be notified with one or more alternative routes. If no alternative routes are generated by mobile vehicle re-routing application 152, 154, then another search may be requested. If multiple alternative routes are generated by mobile vehicle re-routing application 152, 154, then additional attributes may be given by mobile vehicle client 110, 112, 114 and another search may be requested.

Alternatively, mobile vehicle re-routing subsystem 150 may re-distribute traffic around the traffic incident site as seen in block 250. Mobile vehicle re-routing subsystem 150 may assign an alternative route to vehicle client 110, 112, 114. The assignment of alternative routes to vehicle client 110, 112, 114 may be done, for example, using a traffic re-distribution algorithm. The traffic re-distribution algorithm, for example, may be a round-robin algorithm where each mobile vehicle client 110, 112, 114 in turn, is assigned one of the alternative routes.

Figure 3:
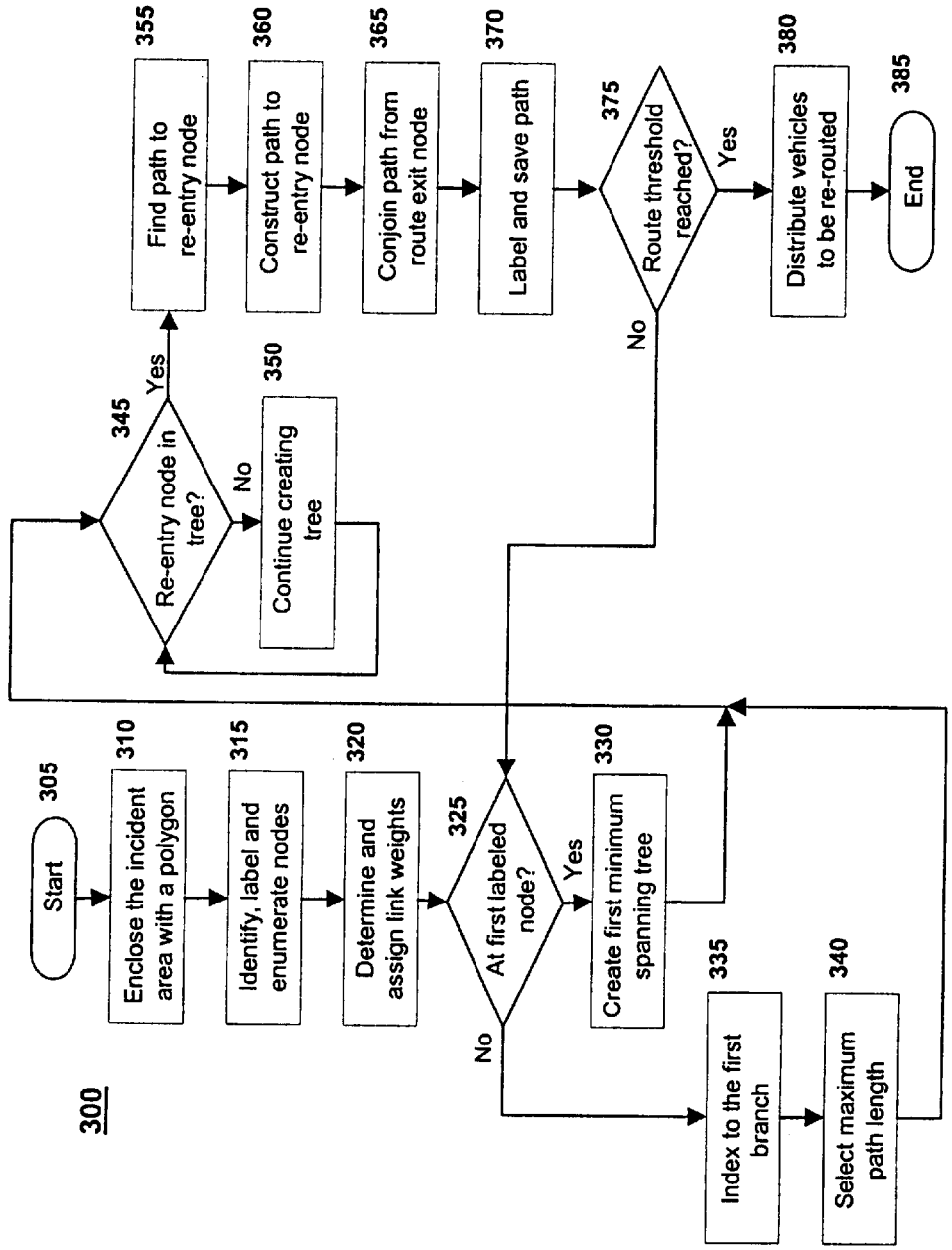
FIG. 3 is a flow diagram of one embodiment of a traffic re-routing algorithm for mobile vehicle route generation and assignment in accordance with the current invention.

FIG. 3 shows a flow diagram of one embodiment of a traffic re-routing algorithm for mobile vehicle route generation and assignment in accordance with the present invention at 300.

The traffic re-routing algorithm 300 may generate and assign alternative routes around a traffic incident site to mobile vehicles. As seen at block 305, the traffic re-routing algorithm may be initiated upon a request from mobile client 110, 112, 114. The request may initiate a method to generate alternative routes and assign alternative routes to the mobile vehicle.

As seen at block 310, a traffic incident site is enclosed with a geometric boundary. The geometric boundary may contain the traffic incident site, an exit point from an intended vehicle route, and a re-entry point on the intended vehicle route. The polygon may also include multiple intersections. The polygon may be a square, rectangle or polygon. The polygon may, for example, be centered on the traffic incident site. The polygon may include, for example, only one route exit point. Alternatively, the polygon may include, for example, more than one route exit point. Similarly, the polygon may include one or more re-entry points. The polygon may, for example, surround a corridor along the intended vehicle route and include the traffic incident site, one or more route exit points, and one or more route re-entry points. The polygon may be enlarged along one or more edges to enclose a larger area. The polygon may be made larger if no alternative routes are generated by the traffic re-routing algorithm 300, or be made smaller if numerous alternative routes are generated by the traffic re-routing algorithm 300. The polygon may appear like a circle or appear to have smooth, curved edges along one or more sides if a sufficient number of vertices are used in the polygon generation.

As seen at block 315, intersections within the polygon are identified, labeled and enumerated. An intersection within the polygon may be identified, for example, at a cross section between two roadways. An intersection within the polygon may also be identified, for example, at a T-intersection where one roadway terminates at another roadway. The route exit point may be identified as an intersection, and the route re-entry point may be identified as another intersection. The intersections may be labeled, though not all intersections need be labeled. Labeled intersections may include, for example, all intersections within the polygon on major arterial roads, or all intersections within the polygon that have traffic control lights. The route exit point and route re-entry point may be labeled. Labeled intersections may be enumerated. Enumerated intersections may be assigned numbers, for example, with the first numbered intersection being the route exit point and the route re-entry point being assigned the largest sequential number. Alternatively, the route exit point may be assigned number "1", the route re-entry point assigned number "2", and other labeled intersections assigned consecutively increasing numbers with, for example, increasing longitude and latitude or distance from the exit point.

As seen at block 320, road segments, or "links" between intersections may be determined and assigned weights. A road segment between intersections may be assigned a weight if, for example, it connects two enumerated intersections. A road segment between intersections may also be assigned a weight if, for example, it connects two enumerated intersections and is a freeway, expressway, or arterial road. A weight assigned to a road segment or link may be a number equal to the distance between the enumerated intersections in, for example, miles.

A weight assigned to a link may depend on the completeness of knowledge available. The link weight may be assigned, for example, in the presence of statistically relevant real time traffic information. The link weight may be assigned, for example, in the absence of statistically relevant time traffic information but in the presence of historically relevant diurnal traffic information. The link weight may also be assigned, for example, in the absence of statistically relevant real time information and in the absence of historically relevant diurnal traffic information. In the absence of real time traffic flow data and historic traffic flow data, the link weight may be assigned, for example, based on link characteristics. Link characteristics may include, for example, various condition factors.

A weight assigned to a link may be based on one or more condition factors. A condition factor may be, for example, the distance between the enumerated intersections. Another condition factor may be, for example, equal to the travel time between enumerated intersections. Travel time between intersections may be determined, for example, from measurements of vehicle speeds along the road segment or by monitoring traffic backup at intersections. Travel time between intersections may also be determined, for example, from historically relevant statistical information. Historically relevant statistical information may include diurnal effects such as rush hour duration and magnitude, or the impact of local weather such as rainfall or snowfall on traffic speeds. Another condition factor may be, for example, equal to the distance between enumerated intersections divided by the local speed limit. Another condition factor may be, for example, the number of stop signs or traffic lights along the link, with the condition factor equal to, for example, the sum of the number of stop signs and traffic lights along the road segment. Another condition factor may be, for example, the angle a roadway segment makes with the intended vehicle route. Other condition factors may be dependent, for example, on the number of left turns, number of lanes, number of driveways or synchronization of the traffic lights. Other condition factors may be dependent, for example, on the road surface, road conditions, or wear and tear on a vehicle. Other condition factors may also be established, for example, by personal preferences or by a personal profile. Personal preferences or personal profiles may include, for example, predisposition towards arterial roads or expressways, or dislike of stop signs, or desire for a scenic bypass, or preference to long distances between intersections. Personal preferences or personal profiles may also include, for example, desired stops at a coffee shop, fast-food restaurant, bank, post office, grocery store or gas station.

Condition factors may be crisp, clear and well defined. For example, local speed limits or number of stop signs between enumerated intersections may be crisp. Alternatively, condition factors may be fuzzy or not well defined. For example, personal preferences or statistically relevant diurnal traffic information may be fuzzy. The condition factors may also be dynamic. For example, traffic backup at an intersection, or amount of ice on the roadway may be dynamic.

Link weights may be determined and assigned to a roadway segment based on one or more condition factors. The selected condition factors may be combined in a composite fashion to determine the link weight. For example, the selected condition factors may simply be added to determine the link weight. Or, for example, the condition factors may be individually multiplied by a weighting coefficient prior to adding the link weights to determine the composite link weight. The same condition factors may be used for determination of all link weights in the network. Link weights may be assigned to all links between enumerated intersections.

The route generation algorithm for determining a suitable route from the route exit point to the route re-entry point may now be executed. As seen at block 325, the route generation algorithm may begin by creating a minimum spanning tree starting from the first enumerated intersection or node, the route exit point. A minimum spanning tree may be a representation of certain links from the graph and link weight network representation for the enumerated intersections within the polygon. A first minimum spanning tree may be generated, as seen at block 330. Each enumerated intersection that is connected to the first node and the associated link weight is added to the minimum spanning tree. A branch may be formed when more than one link emanates from a node. The minimum spanning tree generation may be continued by adding to each branch all of the links and their corresponding link weights to the next node. Links and their link weights along with subsequent nodes, links and link weights may be added to the current node based on the smallest weight emanating from the current node. Once a node has been used in the minimum spanning tree generation, it may not be used again. The minimum spanning tree generation may be completed when the route re-entry point is added to the minimum spanning tree, as seen in block 345 and block 350. Generation of a minimum spanning tree may be stopped, for example, when the route re-entry point is added to the tree.

As seen at block 355, a path may be found from the route exit point to the route re-entry point from the minimum spanning tree. As seen at block 360, a path may be constructed from the route exit point to the route re-entry point including all intermediate nodes. As seen at block 370, the path may be labeled and saved.

Additional alternative routes may be generated, if the route generation threshold is not reached as seen at block 375. If an insufficient number of alternative routes have been generated, an additional alternative route may be generated. As seen at block 325, an additional alternative route may be created by the generation of an additional minimum spanning tree. The additional minimum spanning tree may be generated beginning at the first node and adding links and their associated link weights until the first branch is encountered, as seen at block 335. Rather than selecting the link with the smallest link weight, the link with the largest link weight may be selected as seen at block 340. For example, the link with the largest condition factor based on distance between enumerated intersections may be selected. The generation of the minimum spanning tree may continue as before, adding each link and associated link weight until the re-entry node is added to the tree. A path may be found from the route exit point to the route re-entry point from the additional minimum spanning tree. The path may be constructed from the route exit point to the route re-entry point including all intermediate nodes. For instances where the newly created minimum spanning tree does not contain the route exit node, the route exit node and any other nodes in the path to the start of the minimal spanning tree are conjoined as seen at block 365. The path may be labeled and saved. Additional alternative routes may be generated in a similar fashion, until the route generation threshold is reached.

As seen at block 380, the mobile vehicles may be re-routed around the traffic incident site using a traffic re-distribution algorithm. The traffic re-distribution algorithm may be, for example, a round-robin algorithm where each mobile vehicle, in turn, is assigned an alternative route. Alternatively, the traffic re-distribution algorithm may assign more mobile vehicles to an alternative route with the least transit time, based on feedback from mobile vehicles completing their assigned routes. As seen at block 385, the traffic re-distribution algorithm may be ended when all traffic has been re-routed.

Figure 4:
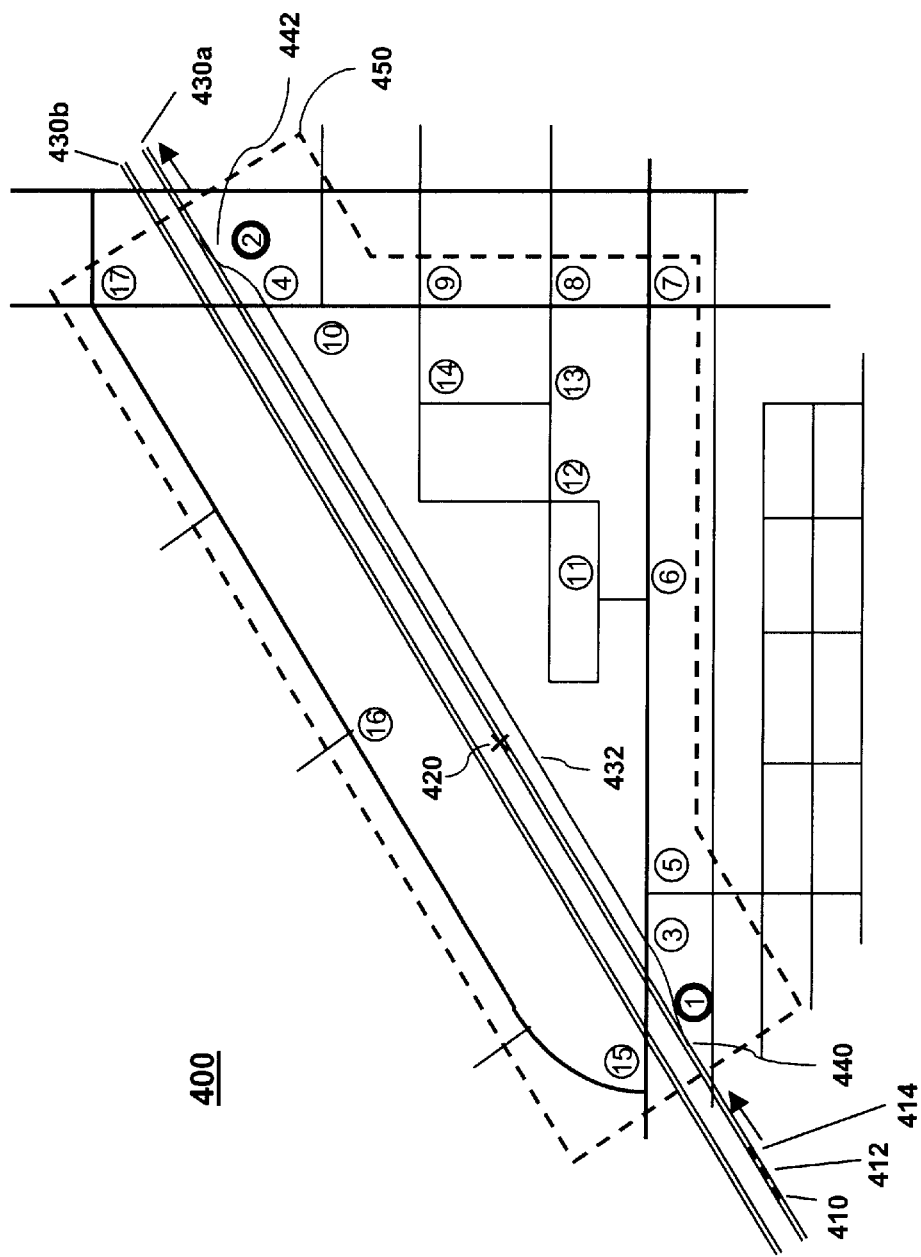
FIG. 4 is an illustration of a traffic incident site and surrounding roadway map in accordance with the current invention.

FIG. 4 shows an illustration of a traffic incident site and surrounding roadway map in accordance with the present invention at 400.

In the traffic incident site and surrounding roadway map 400, mobile vehicle clients 410, 412, 414 travel along intended route 430*a*. Intended route 430*a* and route 430*b* form, for example, a divided section of interstate highway. A traffic incident may occur, for example, at traffic incident site 420 on intended route 430*a* causing one or more mobile traffic clients 410, 412, 414 to request alternative routes. A route exit point 440 and a route re-entry point 442 are determined. A polygon 450 may be drawn along the intended route 430*a*, enclosing the route exit point 440, traffic incident site 420, and route re-entry point 442. Polygon 450 may be drawn as a corridor along intended route 430*a*. Polygon 450 may be extended along one or more sides to include arterial roads in the vicinity of traffic incident site 420.

A multiplicity of intersections lying within polygon 450 may be identified, labeled and enumerated. As seen in FIG. 4, route exit point 440 may be labeled and enumerated as node 1. Similarly, route re-entry point 442 may be labeled and enumerated as node 2. Additional intersections within polygon 450 may be labeled and enumerated as nodes 3, 4, 5, 6, 7, 8, 9, 10, 11, 12, 13, 14, 15, 16 and 17. The roadway segment between nodes 1 and 3 represents, for example, an off-ramp. The roadway segment between nodes 4 and 2 represents, for example, an on-ramp. Roadway segment 432 between nodes 3 and 4 represents, for example, a frontage road. The roadway segments between nodes 3, 5, 6, 7, 8, 9, 10 and 4 represents, for example, an arterial road. Roadway segments in the vicinity of nodes 11, 12, 13 and 14 represent, for example, commercial streets in an industrial park. Roadway segments between nodes 15, 16 and 17 represent, for example, another arterial road. Other intersections may exist within polygon 450, which are not enumerated because they may represent, for example, residential roads.

Figure 5:
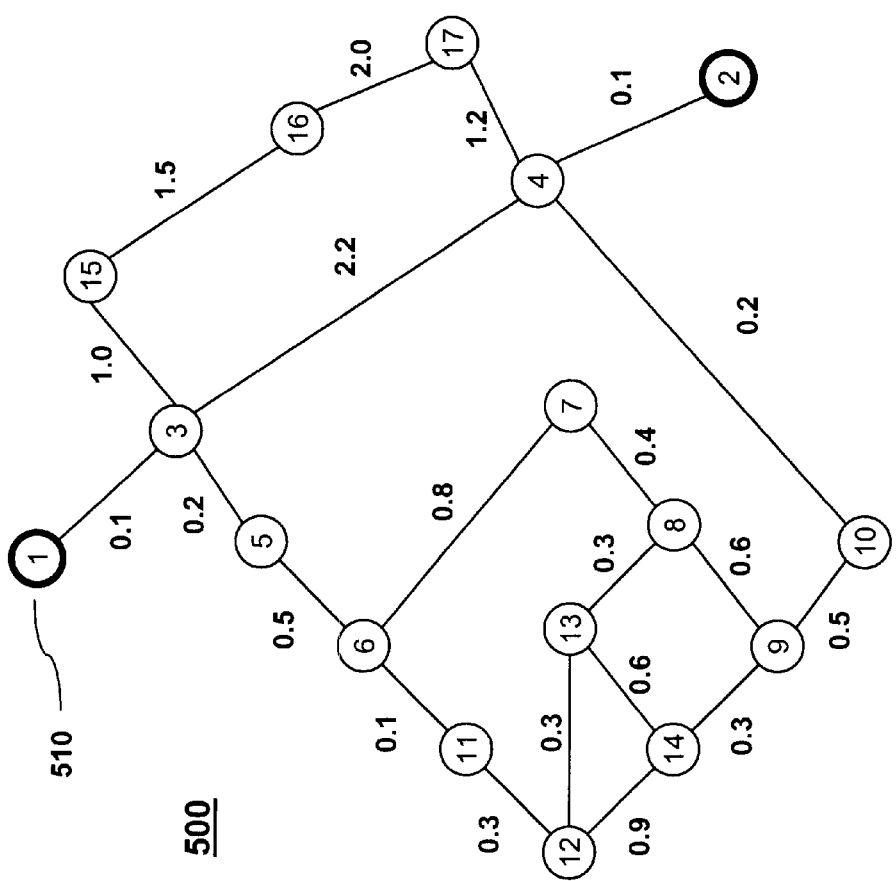
FIG. 5 is a graph and link weight network representation for the traffic incident site and surrounding roadway illustrated in FIG. 4 in accordance with the current invention.

FIG. 5 shows a graph and link weight network representation for the traffic incident site and surrounding roadway map 400 in accordance with the present invention at 500.

The graph and link weight network 510 may comprise all enumerated nodes, links and associated link weights in a graphical form. For example, enumerated nodes, links and associated link weights for the traffic incident site and surrounding roadway map 400 are illustrated. Route exit node 1 is connected to node 3. Route re-entry node 2 is connected to node 4. Node 3 is connected to nodes 4, 5 and 15, and so on and so forth. Link weights may be assigned to each link. In graph and link weight network 510, link weights are shown next to their associated links. The link weights, in this example, are equal to the distance between enumerated intersections in miles.

Figure 6:
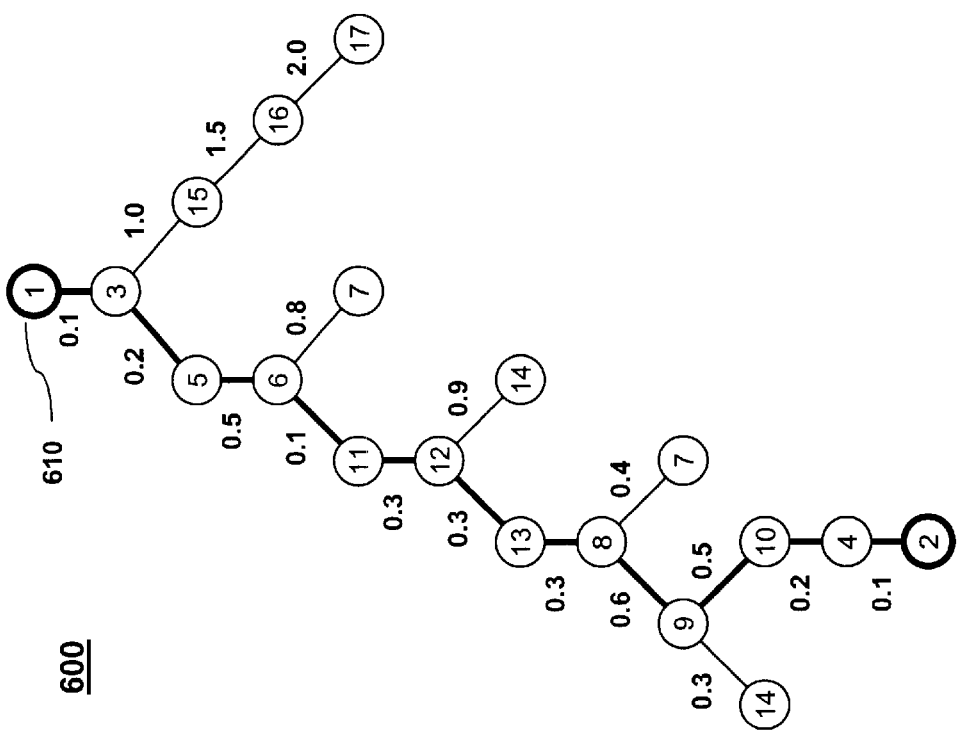
FIG. 6 is a minimum spanning tree representation for one alternative route in accordance with the current invention.

FIG. 6 shows a minimum spanning tree representation for one alternative route in accordance with the present invention at 600.

The minimum spanning tree 610 shows one example of an alternative route generated from graph and link weight network representation 500. The minimum spanning tree 610 is based on the smallest link weight between nodes. As indicated in the description of traffic re-routing algorithm 300, the minimum spanning tree 610 shows a path from route exit node 1 and route re-entry node 2. Minimum spanning tree 610 also shows links between enumerated nodes and their associated weights.

Figure 7:
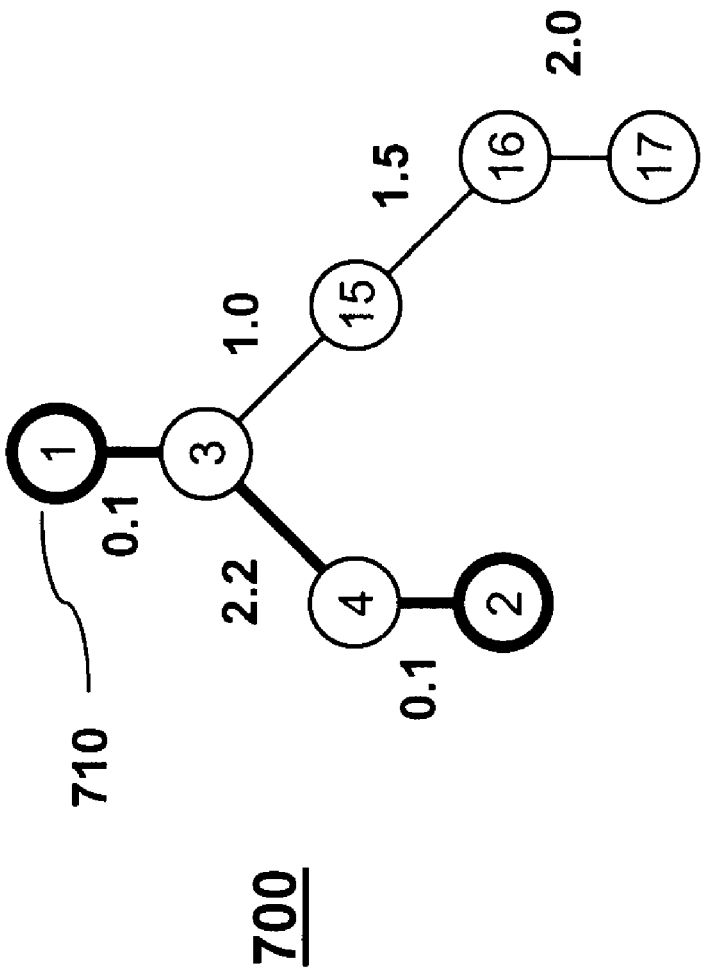
FIG. 7 is a minimum spanning tree representation for another alternative route in accordance with the current invention.

FIG. 7 shows a minimum spanning tree representation for another alternative route in accordance with the present invention at 700.

The minimum spanning tree 710 shows an example of another alternative route generated from graph and link weight network representation 500. In this example, the link with the largest link weight at the first branch is used in the generation of the minimum spanning tree 710. Otherwise, the smallest link weight between nodes is used. The minimum spanning tree 710 shows a path from route exit node 1 and route re-entry node 2. Minimum spanning tree 710 also shows links between enumerated nodes and their associated weights.

Figure 8:
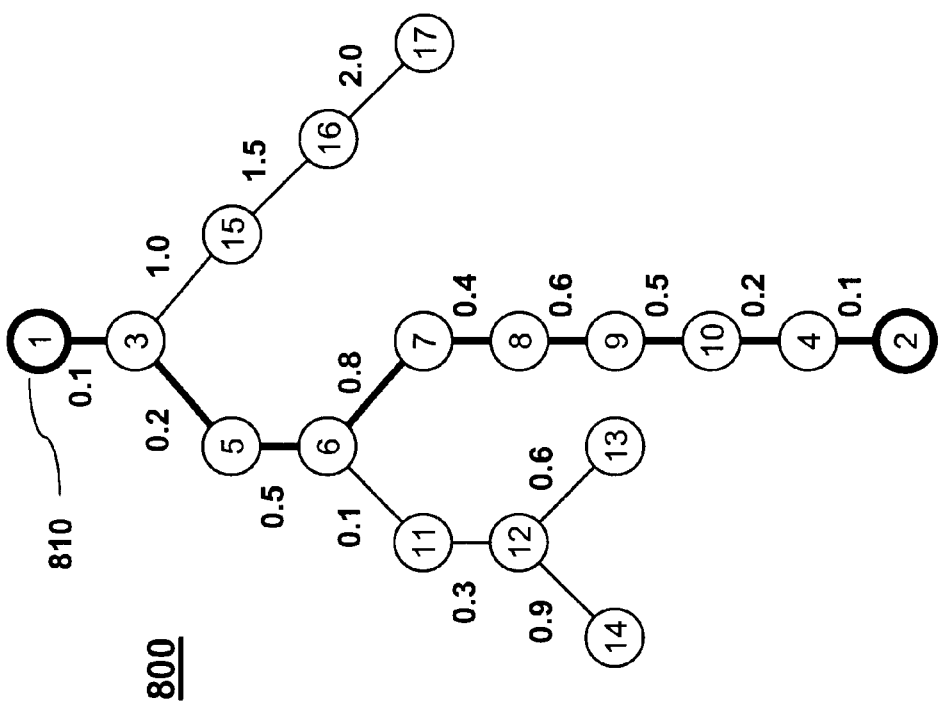
FIG. 8 is a minimum spanning tree representation for yet another alternative route in accordance with the current invention.

FIG. 8 shows a minimum spanning tree representation for yet another alternative route in accordance with the present invention at 800.

The minimum spanning tree 810 shows an example of another alternative route generated from graph and link weight network representation 500. In this example, the link with the largest link weight at the second branch is used. Otherwise, the smallest link weight between nodes is used. The minimum spanning tree 810 shows a path from route exit node 1 and route re-entry node 2. Minimum spanning tree 810 also shows links between enumerated nodes and their associated weights.

Other minimum spanning trees may be generated, for example, in strict accordance with Prim's or Krushkall's algorithms, or by using the largest link weight at one or more branches in accordance with the current invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. Method of routing a mobile vehicle around a traffic incident comprising:
   receiving a traffic incident location;
   receiving an intended vehicle route;
   determining a polygon based on the traffic incident location and the intended vehicle route;
   determining at least one route exit point and at least one route re-entry point;
   determining a plurality of intersections within the polygon;
   assigning link weights between the intersections based on at least one condition factor; and
   determining at least one alternative route between the route exit point and the route re-entry point based on the assigned link weights.

2. The method of claim 1 wherein the link weights are based on a condition factor comprising a distance between intersections.

3. The method of claim 1 wherein the link weights are substantially equal to the distance between the intersections.

4. The method of claim 2 further comprising:
   selecting the alternative route having at least one link weight corresponding to a greatest distance.

5. The method of claim 1 wherein the link weights are based on at least one condition factor from a set consisting of distance, travel time, number of traffic lights, duration of traffic lights, synchronization of traffic lights, speed limits, number of stop signs, number of left turns, number of lanes, number of cross streets, number of driveways, time of day, road conditions, weather, traffic backup, angle of link with respect to intended vehicle route, fuel requirements, vehicle wear-and-tear, personal profile, personal preferences, other desired stops, statistical information, dynamic information and real-time information between intersections.

6. The method of claim 1 further comprising:
   labeling each alternative route.

7. The method of claim 6 further comprising:
   assigning a mobile vehicle one of the labeled routes based on a traffic distribution algorithm.

8. The method of claim 7 wherein the traffic distribution algorithm is a round-robin algorithm.

9. A computer usable medium including a program for determining mobile vehicle routing around a traffic incident, comprising:
   computer program code for receiving a traffic incident location;
   computer program code for receiving an intended vehicle route;
   computer program code for determining a polygon based on the traffic incident location and the intended vehicle route;
   computer program code for determining at least one route exit point and at least one route re-entry point;
   computer program code for determining a plurality of intersections within the polygon;
   computer program code for assigning link weights between the intersections based on at least one condition factor; and computer program code for determining at least one alternative route between the route exit point and the route re-entry point based on the assigned link weights.

10. The computer usable medium of claim 9, further comprising:

computer program code for selecting the alternative route having at least one link weight corresponding to a greatest distance.

11. The computer usable medium of claim 9, further comprising:

computer program code for labeling each alternative route.

12. The computer usable medium of claim 11, further comprising:

computer program code for assigning one of the labeled routes to a mobile vehicle based on a traffic distribution algorithm.

13. A mobile vehicle re-routing system comprising:

means for receiving a traffic incident location;

means for receiving an intended vehicle route;

means for determining a polygon based on the traffic incident location and the intended vehicle route;

means for determining at least one route exit point and at least one route re-entry point;

means for determining a plurality of intersections within the polygon;

means for assigning link weights between the intersections based on at least one condition factor; and means for determining at least one alternative route between the route exit point and the route re-entry point based on the assigned link weights.

14. The system of claim 13 further comprising:

means for selecting the alternative route having at least one link weight corresponding to a greatest distance.

15. The system of claim 13 further comprising:

means for labeling each alternative route.

16. The system of claim 15 further comprising:

means for assigning a mobile vehicle one of the labeled routes based on a traffic distribution algorithm.

* * * * *